March 6, 1973  T. C. CAVIS  3,719,059
COOLING APPARATUS
Filed April 20, 1970
FIG. 1
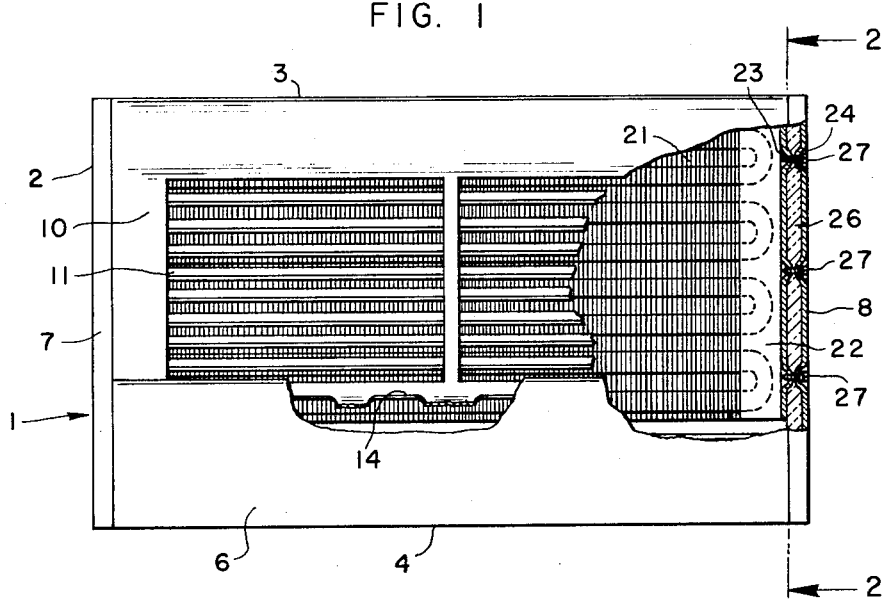
FIG. 2
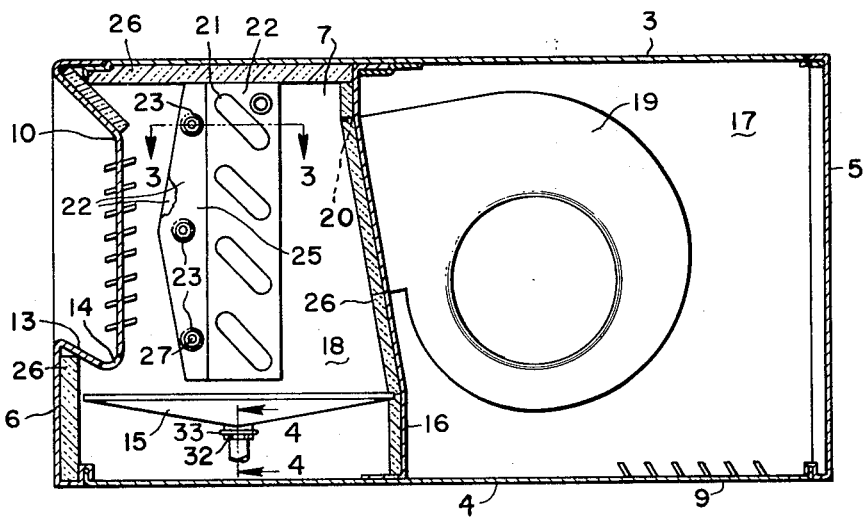
FIG. 4
FIG. 3
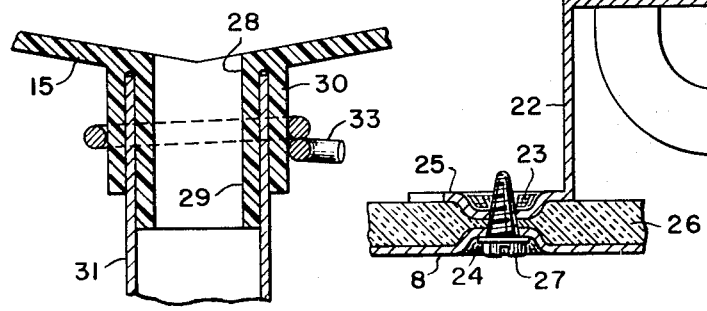
INVENTOR.
THOMAS C. CAVIS

United States Patent Office 3,719,059
Patented Mar. 6, 1973

3,719,059
COOLING APPARATUS
Thomas C. Cavis, Onalaska, Wis., assignor to The Trane Company, La Crosse, Wis.
Filed Apr. 20, 1970, Ser. No. 30,151
Int. Cl. F25d 21/14
U.S. Cl. 62—285
6 Claims

ABSTRACT OF THE DISCLOSURE

A fan coil air cooling unit having a generally rectangular housing with air inlet and outlet apertures is shown. The air cooling heat exchanger is supported intermediate the inlet and outlet apertures by but thermally insulated from the sidewalls of the housing to thereby reduce moisture condensation on the exterior sidewalls of the housing. The outlet aperture of the housing provided with a recessed grill also for purposes of mitigating condensate formation at the grill surfaces. The grill overhangs a drain pan to permit condensate which is formed at the grill surface to drain along with condensate from the cooling heat exchanger. A unique drain pan to condensate tube connection is provided.

---

Condensate or moisture formation and disposition is a continuing problem with air conditioning apparatus. Moisture which is condensed in or on air conditioning apparatus often drains therefrom onto finished floors and interior furnishings only to cause expensive damage. The invention herein disclosed has for its primary purpose the mitigation or complete elimination of atmospheric condensate drippage from the refrigeration apparatus housing.

It is another object of this invention to mitigate heat conduction from the housing walls to the cooling heat exchanger mounted thereon within the housing. It is still a further object of this invention to provide a means of mitigating condensate formation on the air discharged grill of an air cooling heat exchange apparatus.

Another object of this invention is to provide a means of draining condensate from the outlet grill of a heat exchange apparatus by recessing the grill so as to overlie a drain pan.

And still another object of this invention is to provide a means to prevent leakage from the drain pan of an air cooling heat exchange apparatus at its connection with the drain pan condensate outlet tube.

Other objects and advantages of the instant invention will become apparent as this specification proceeds to describe the invention with reference to the accompanying drawings in which:

FIG. 1 is a front view of the air cooling refrigeration apparatus having portions broken away to more clearly view aspects of the invention;

FIG. 2 is a section of the air cooling apparatus taken at line 2—2 of FIG. 1;

FIG. 3 is an enlarged section of a detail of the invention taken along line 3—3 of FIG. 2; and FIG. 4 is also an enlarged section of a detail taken along line 4—4 of FIG. 2.

Now referring to the drawings it will be seen that fan coil air cooling unit 1 has a rectangular housing 2 including top wall 3, bottom wall 4, rear wall 5, front wall 6, and sidewalls 7 and 8. Bottom wall 4 is perforated at the rear to define an inlet aperture 9. Front wall 6 has a recessed area 10, a portion 11 of which is perforated to define an outlet aperture and grill 12. That portion of front wall 6 at the foot of grill 12 is inclined inwardly and downwardly to define a sill 13. Sill 13 has drain apertures 14 at the lower side which overlie drain pan 15. The inter-relationship of these elements will be described in connection with the operation of the fan coil air cooling unit.

A generally vertically extending partition 16 divides the interior of housing 2 into a fan chamber 17 and a heat exchanger chamber 18. A fan or blower 19 disposed in fan chamber 17 is arranged to blow air through aperture 20 in partition 16.

An air cooling type fin and tube heat exchanger 21 is mounted via its end support plate brackets 22 to sidewalls 7 and 8 within heat exchanger chamber 18 over drain pan 15. Each end support plate bracket has a plurality of outwardly extending bracket dimples 23 in registry with inwardly directed sidewall dimples 24 whereby end support plate brackets 22 are spaced from sidewalls 7 and 8 except at dimples 23. The space intermediate the leg 25 of bracket 22 which carries dimples 23 and the sidewall of housing 2 is filled with thermal insulation 26. Bracket 23 is secured to the sidewall at the dimples by way of sheet metal screws 27. The interior walls of chamber 18 are also preferably covered with a thermal insulation 26.

Drain pan 15 is constructed of plastic and has an outlet aperture 28. Depending from the bottom of drain pan 15 in concentric relation with aperture 28 is a first annular skirt 29 formed integrally with the body of pan 15. A second annular skirt 30 also formed integrally with drain pan 15 depends from the bottom thereof in spaced circumscribing concentric relationship with first annular skirt 29. An annular drain pan condensate conduit 31 is connected to drain pan 15 in such a manner that it occupies the space between first and second annular skirts 29 and 30 whereby the end of conduit 31 circumscribes first annular skirt 29 and is circumscribed by second annular skirt 30. Second annular skirt 30 is preferably provided with slots 32 (FIG. 2) to more readily permit radially inward deflection. Skirt 29 is biased radially inwardly in gripping relationship with the end of conduit 31 by means of a ring clamp 33 for securing conduit 31 to drain pan 15.

OPERATION

During operation of the fan coil air cooling unit 1 a cooling fluid is conducted through the tubes 34 of heat exchanger 21 thereby cooling fins 35. Air is drawn into chamber 17 through apertures 9 and blown through chamber 18 by blower 19. In passing through chamber 18 toward outlet grill 12, the air is cooled by the fins of air cooling heat exchanger 21. Condensate formed at heat exchanger 21 drains into underlying drain pan 15. While end support plate brackets 22 are readily cooled by their connection with tubes 34, heat conduction from sidewalls 7 and 8 to brackets 22 is substantially eliminated by the relatively high thermoresistant path formed by the dimple and insulation joint between leg 25 of bracket 22 and the sidewalls of housing 2. Despite the fact that sidewalls 7 and 8 support cooling heat exchanger 21, sidewalls 7 and 8 remain relatively warm to substantially preclude the formation of condensation on the exterior surface thereof.

The recessed orientation of grill 12 substantially prevents the infringement of induced air in the vicinity of the front of housing 2 from impinging upon the relatively cold grill 12 thereby mitigating the formation of condensate at grill 12. To the extent that some condensate is formed at grill 12 such as during startup and to the extent that condensate is carried over with the airstream from heat exchanger 21 to grill 12, such condensate will drain downwardly along grill 12 into underlying drain pan 15. Should such draining occur on the exterior side of grill 12, such condensate may drain through apertures 14 at the lower inner side of sill 13.

The condensate from grill 12 and from heat exchanger 21 which falls unto drain pan 15 is conducted by way of drain pan condensate conduit 31 without leakage at the joint between conduit 31 and drain pan 15 by reason of the relatively tight seal formed by the first and second annular skirts and ring clamp 33.

Thus it will be seen that applicant's invention substantially solves numerous problems of condensate formation in fan coil air cooling units. Having now described the preferred embodiment of my invention, I contemplate that many changes may be made without departing from the scope or spirit of my invention and I accordingly desire to be limited only by the claims.

I claim:

1. A fan coil air cooling apparatus comprising: a housing having front, back, top, bottom, and sidewalls; the walls of said housing defining an air inlet aperture to and an air outlet aperture from the interior of said housing; a blower disposed within said housing for passing a stream of air from said inlet aperture to said outlet aperture; an air cooling heat exchanger disposed in said housing in said airstream; a condensate drain pan underlying said heat exchanger; said outlet aperture being provided with an outlet grill recessed from the face of said front wall and overlying said drain pan; the exterior face of said grill being recessed from the exterior face of said front wall.

2. The apparatus as defined by claim 1 including a sill disposed at the foot of said grill on the exterior side thereof which is slanted downwardly and inwardly of said housing.

3. The apparatus as defined by claim 2 wherein said sill and said grill are connected and said sill is provided with a plurality of drain apertures overlying said drain pan.

4. A fan coil air cooling apparatus comprising: a housing having front, back, top, bottom, and sidewalls; the walls of said housing defining an air inlet aperture to and an air outlet aperture from the interior of said housing; a blower disposed within said housing for passing a stream of air from said inlet aperture to said outlet aperture; an air cooling heat exchanger disposed in said housing in said airstream; a condensate drain pan underlying said heat exchanger; conduit means for conducting condensate from said heat exchanger via said drain pan; means integral with said drain pan for connecting said drain pan to said conduit means; said means integral with said drain pan including a first annular skirt extending within said conduit means, and a second annular skirt disposed radially outwardly of said conduit means in circumscribing spaced concentric relationship with said first annular skirt.

5. The apparatus as defined by claim 4 wherein said second annular skirt is provided with a plurality of slots therein.

6. The apparatus as defined by claim 5 including a clamp ring substantially circumscribing said second annular skirt in the slotted portion thereof.

References Cited

UNITED STATES PATENTS

| | | | |
|---|---|---|---|
| 2,337,518 | 12/1943 | Young | 62—291 X |
| 2,218,208 | 10/1940 | Hopkins | 62—290 |
| 2,251,649 | 8/1941 | Wichmann | 62—290 |
| 3,306,070 | 2/1967 | Herb | 62—285 |
| 3,357,763 | 12/1967 | Toper | 62—291 X |
| 3,404,540 | 10/1968 | Bryans | 62—285 |
| 3,491,550 | 1/1970 | Cavis | 62—291 |

WILLIAM J. WYE, Primary Examiner

U.S. Cl. X.R.

62—426, 276